(12) United States Patent
Terada

(10) Patent No.: US 11,125,410 B2
(45) Date of Patent: Sep. 21, 2021

(54) VEHICLE LAMP

(71) Applicant: KOITO MANUFACTURING CO., LTD., Tokyo (JP)

(72) Inventor: Kazuki Terada, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 100 days.

(21) Appl. No.: 16/286,225

(22) Filed: Feb. 26, 2019

(65) Prior Publication Data

US 2019/0195461 A1 Jun. 27, 2019

Related U.S. Application Data

(63) Continuation of application No. PCT/JP2017/029629, filed on Aug. 18, 2017.

(30) Foreign Application Priority Data

Aug. 26, 2016 (JP) .............................. JP2016-166025

(51) Int. Cl.
*F21S 43/14* (2018.01)
*F21S 43/19* (2018.01)
(Continued)

(52) U.S. Cl.
CPC ............. *F21S 43/241* (2018.01); *F21S 43/14* (2018.01); *F21S 43/195* (2018.01);
(Continued)

(58) Field of Classification Search
CPC ...... F21S 43/241; F21S 43/237; F21S 43/247; F21S 43/14; F21S 43/251; F21S 43/245; F21S 43/195; F21S 43/26; F21S 45/47
See application file for complete search history.

(56) References Cited

U.S. PATENT DOCUMENTS 7,699,511 B2* 4/2010 Kawaji ................. B60R 1/1207
362/494
8,870,423 B2* 10/2014 Mihara ................. F21S 43/245
362/511
(Continued)

FOREIGN PATENT DOCUMENTS

CN 104296038 A 1/2015
CN 104728731 A 6/2015
(Continued)

OTHER PUBLICATIONS

International Search Report (PCT/ISA/210) dated Oct. 31, 2017, by the Japan Patent Office as the International Searching Authority for International Patent Application No. PCT/JP2017/029629.
(Continued)

*Primary Examiner* — Arman B Fallahkhair
(74) *Attorney, Agent, or Firm* — Buchanan Ingersoll & Rooney PC

(57) ABSTRACT

A vehicle lamp includes: a first light source; and a columnar first light guide. The first light guide includes an incidence surface on which light of the first light source is incident, a first part that extends from the incidence surface toward one side in a direction of vehicle width, a second part that extends from an end of the first part toward one side in the vertical direction, and a third part that extends from an end of the second part toward the other side in the direction of vehicle width.

5 Claims, 5 Drawing Sheets

(51) Int. Cl.
*F21S 43/241* (2018.01)
*F21S 43/251* (2018.01)
*F21S 43/247* (2018.01)
*F21S 45/47* (2018.01)
*F21S 43/20* (2018.01)
*F21S 43/245* (2018.01)
*F21S 43/237* (2018.01)

(52) U.S. Cl.
CPC .......... *F21S 43/237* (2018.01); *F21S 43/245* (2018.01); *F21S 43/247* (2018.01); *F21S 43/251* (2018.01); *F21S 43/26* (2018.01); *F21S 45/47* (2018.01)

(56) References Cited

U.S. PATENT DOCUMENTS

| | | | |
|---|---|---|---|
| 9,328,891 | B1 | 5/2016 | Dernar et al. |
| 2007/0290829 | A1* | 12/2007 | Geiger ............... G02B 6/0078 340/475 |
| 2010/0008088 | A1* | 1/2010 | Koizumi ............. G02B 6/0073 362/235 |
| 2013/0044503 | A1 | 2/2013 | Mihara et al. |
| 2014/0160777 | A1 | 6/2014 | Mugge |
| 2014/0177249 | A1* | 6/2014 | Iseki ..................... F21S 43/19 362/511 |
| 2015/0176790 | A1 | 6/2015 | Svettini et al. |
| 2016/0061397 | A1 | 3/2016 | Ito et al. |
| 2016/0131322 | A1 | 5/2016 | Chen |

FOREIGN PATENT DOCUMENTS

| | | |
|---|---|---|
| CN | 204922778 U | 12/2015 |
| CN | 105387407 A | 3/2016 |
| CN | 105556199 A | 5/2016 |
| DE | 10 2011 050 062 A1 | 11/2012 |
| EP | 2 048 430 A2 | 4/2009 |
| EP | 2 354 637 A2 | 8/2011 |
| EP | 2525139 A2 | 11/2012 |
| EP | 2 811 219 A1 | 12/2014 |
| EP | 2 960 574 A1 | 12/2015 |
| JP | 2010272469 A | 12/2010 |
| JP | 2012-190762 A | 10/2012 |
| JP | 2015-008111 A | 1/2015 |
| JP | 2015-72748 A | 4/2015 |
| JP | 2015153619 A | 8/2015 |
| JP | 2016-115397 A | 6/2016 |
| JP | 2016-122499 A | 7/2016 |
| WO | 2015029852 A1 | 3/2015 |

OTHER PUBLICATIONS

Written Opinion (PCT/ISA/237) dated Oct. 31, 2017, by the Japan Patent Office as the International Searching Authority for International Patent Application No. PCT/JP2017/029629.
European Extended Search Report issued in corresponding European Application No. 17843495.7, dated Apr. 20, 2020, 7 pages.
Li et al., "Numerical Simulation and Experiment Study on Optical Transparent Plastic during Injection Molding", China Plastics Industry, Jan. 31, 2015, vol. 4, Issue 1, pp. 43-47. (total pages 6).
Office Action dated Sep. 25, 2020, by the Chinese Patent Office in corresponding Chinese Patent Application No. 201780049557.6 and English translation of the Office Action. (21 pages).
Office Action dated May 18, 2021 issued in corresponding Japanese Patent Application No. 2018-535640, with English translation (5 pages).

* cited by examiner

VEHICLE LAMP

CROSS-REFERENCE TO RELATED APPLICATIONS

This application is based upon and claims the benefit of priority from the prior Japanese Patent Application No. 2016-166025, filed on Aug. 26, 2016, and International Patent Application No. PCT/JP2017/029629, filed on Aug. 18, 2017, the entire content of each of which is incorporated herein by reference.

BACKGROUND

Field of the Invention

The present invention relates to vehicle lamps, and more particularly to a vehicle lamp used in a vehicle such as an automobile.

Description of the Related Art

Vehicle lamps configured to output light of a light source to a space in front of the lamp via a light guide are known. For example, patent document 1 discloses a vehicle lamp structured to caused light to be incident on a columnar light guide via an end thereof, reflected by a reflective step provided on the inner surface of the light guide, and output to a space in the front of the lamp.

patent document 1: JP2012-190762

In related-art vehicle lamps provided with a light guide, it has been difficult to secure a space for installation of a light source without increasing the size of the vehicle lamp.

SUMMARY OF THE INVENTION

The embodiments addresses the the above-described issue, and a general purpose thereof is to provide a technology for securing a space for installation of a light source while at the same time inhibiting an increase in the size of the vehicle lamp.

An embodiment of the present invention relates to a vehicle lamp. The vehicle lamp includes: a first light source; and a columnar first light guide. The first light guide includes an incidence surface on which light of the first light source is incident, a first part that extends from the incidence surface toward one side in a direction of vehicle width, a second part that extends from an end of the first part toward one side in the vertical direction, and a third part that extends from an end of the second part toward the other side in the direction of vehicle width. According to the embodiments, it is possible to secure a space for installation of a light source while at the same time inhibiting an increase in the size of a vehicle lamp.

It is to be noted that an embodiment obtained by combining the elements described above as appropriate can also be encompassed by the scope of the invention for which patent protection is sought through the present patent application.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
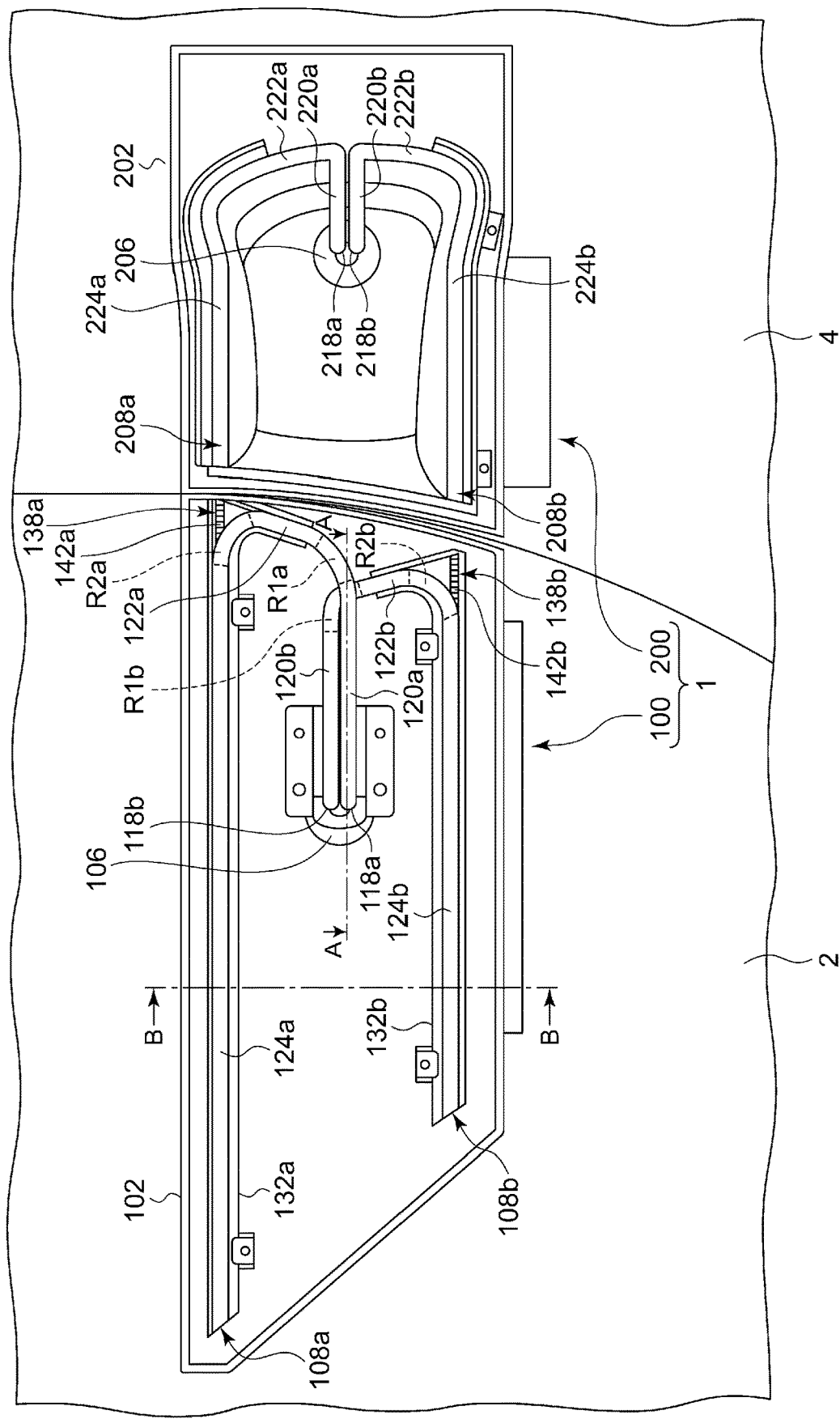
FIG. 1 is a front view showing a schematic structure of a vehicle lamp according to an embodiment.

An embodiment of the present invention relates to a vehicle lamp. The vehicle lamp includes: a first light source; and a columnar first light guide. The first light guide includes an incidence surface on which light of the first light source is incident, a first part that extends from the incidence surface toward one side in a direction of vehicle width, a second part that extends from an end of the first part toward one side in the vertical direction, and a third part that extends from an end of the second part toward the other side in the direction of vehicle width. According to the embodiments, it is possible to secure a space for installation of a light source while at the same time inhibiting an increase in the size of a vehicle lamp.

In the embodiment, a connecting region of the first light guide connecting the second part and the third part may be curved, and the first light guide may include a projection that projects from the connecting region and outward from the curve of the connecting region and that guides light to a region outside the curve. In any of the embodiments described above, two first light guides may be provided, the second part of one of the first light guides may extend upward in the vertical direction, and the second part of the other first light guide may extend downward in the vertical direction. The incidence surface of one of the first light guides may be positioned below the incidence surface of the other first light guide in the vertical direction.

In any of the embodiments described above, the vehicle lamp may include a first lamp unit provided in a movable part of the vehicle and a second lamp unit provided in a fixed part of the vehicle adjacent to the movable part, the first lamp unit and the second lamp unit may be adjacent to each other in the direction of vehicle width, the second lamp unit may include a second light source and a columnar second light guide, the second light guide may include an incidence surface on which light of the second light source is incident, a fourth part that extends from the incidence surface in a direction away from the movable part in the direction of vehicle width, a fifth part that extends from an end of the fourth part toward one side in the vertical direction, and a sixth part that extends from an end of the fifth part in a direction toward the movable part in the direction of vehicle width, the first lamp unit may include the first light source and the first light guide, the first part of the first light guide may extend in a direction toward the fixed part in the direction of vehicle width, and the second part may extend in the same direction as the fifth part in the vertical direction, the third part may extend in a direction away from the fixed part in the direction of vehicle width, and at least a portion of each of the third part and the sixth part may output light toward a space in front of the lamp so as to form a linear light emitting region, and the third part and the sixth part may be provided such that extensions of the light emitting regions respectively formed by the third part and the sixth part are smoothly continuous. In any of the embodiments described above, the first light source is an LED unit, and the LED unit includes an LED and a mount used to carry the LED and mount the LED unit on a body of the vehicle lamp detachably.

Hereinafter, the embodiments will be described based on preferred embodiments with reference to the accompanying drawings. The preferred embodiments do not intend to limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted. The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others.

Figure 2:
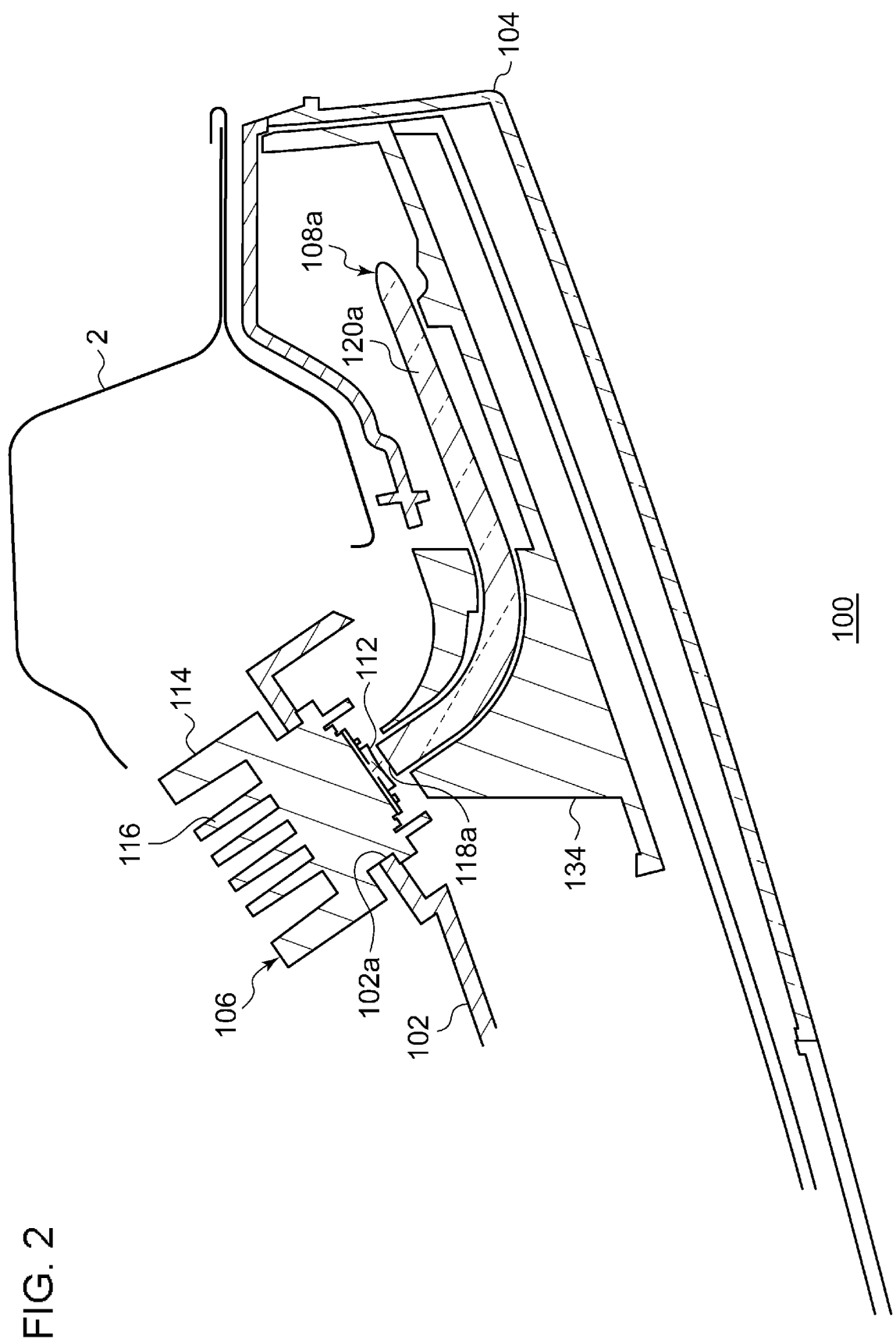
FIG. 2 shows a part of the cross-sectional shape of the vehicle lamp along A-A line of FIG. 1.
Figure 3:
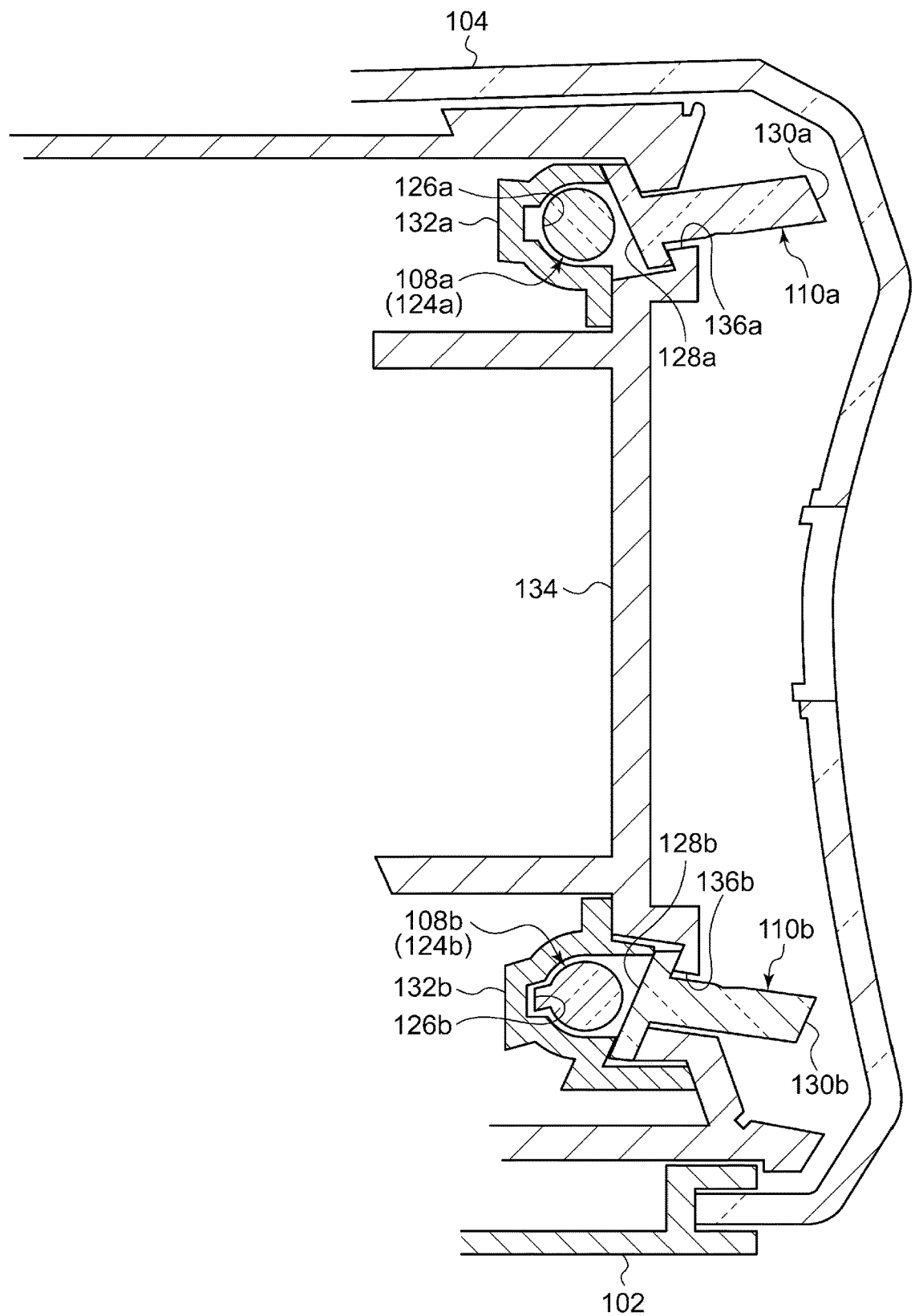
FIG. 3 shows a part of the cross-sectional shape of the vehicle lamp along B-B line of FIG. 1.

FIG. 1 is a front view showing a schematic structure of a vehicle lamp according to an embodiment. FIG. 2 shows a part of the cross-sectional shape of the vehicle lamp along A-A line of FIG. 1. FIG. 3 shows a part of the cross-sectional shape of the vehicle lamp along B-B line of FIG. 1. In FIG. 1, illustration of an outer cover 104, auxiliary light guides 110a, 110b, and a cover member 134 is omitted.

A vehicle lamp 1 according to the embodiment is, for example, a rear combination lamp provided toward the back of the vehicle. The vehicle lamp 1 includes a first lamp unit 100 provided in a movable part 2 of the vehicle, and a second lamp unit 200 provided in a fixed part 4 of the vehicle adjacent to the movable part 2. The first lamp unit 100 and the second lamp unit 200 are adjacent to each other in the direction of vehicle width. In this embodiment, the first lamp unit 100 is positioned inward in the direction of vehicle width, and the second lamp unit 200 is positioned outward in the direction of vehicle width. The movable part 2 and the fixed part 4 are provided with respective recesses that are concave toward the vehicle front. The first lamp unit 100 and the second lamp unit 200 are housed in the respective recesses. For example, the movable part 2 is a rear door panel, and the fixed part 4 is a rear vehicle body panel.

The first lamp unit 100 is provided with a lamp body 102 having an opening and a translucent outer cover 104 that covers the opening of the lamp body 102. A lamp chamber formed by the lamp body 102 and the outer cover 104 is provided with a first light source 106, two first light guides 108a, 108b, and two auxiliary light guides 110a, 110b.

For example, the first light source 106 is comprised of an LED unit. The LED unit as the first light source 106 includes an LED 112 and a mount 114. The mount 114 carries the LED 112 and is detachably fitted in a through hole 102a provided in the lamp body 102. The first light source 106 is provided substantially at the center of the first lamp unit 100 in the vertical direction and substantially at the center in the direction of vehicle width.

The mount 114 includes a heat dissipating fin 116 opposite to the part where the LED 112 is mounted. The head of the LED 112 is dissipated via the heat dissipating fin 116. By configuring the first light source 106 as an LED unit, the first light source 106 can be exchanged easily. The first light source 106 may be a unit in which a semiconductor light emitting device other than an LED such as a laser diode (LD) and an organic or inorganic electroluminescence (EL) device is carried. The first light source 106 may also be a discharge bulb, an incandescent lamp, a halogen lamp, etc.

The two first light guides 108a, 108b are columnar translucent members. For example, the first light guides 108a, 108b are made of a translucent resin material such as acrylic resin and polycarbonate resin.

One of the first light guides 108a includes an incidence surface 118a, a first part 120a, a second part 122a, and a third part 124a. The incidence surface 118a is an end face of the first light guide 108a and is provided to face the first light source 106. The incidence surface 118a substantially faces a space behind the lamp (front side of the vehicle). The light of the first light source 106 is incident on the first light guide 108a from the incidence surface 118a. The first part 120a is a part that extends from the incidence surface 118a toward one side in the direction of vehicle width and, in the case of this embodiment, outward in the direction of vehicle width. The second part 122a is a part that extends from an end of the first part 120a (the end farther from the incidence surface 118a) toward one side in the vertical direction, and, in the case of this embodiment, upward in the vertical direction. The third part 124a is a part that extends from an end of the second part 122a (the end farther from the first part 120a) toward the other side in the direction of vehicle width and, in the case of this embodiment, inward in the vehicle of vehicle width.

The first part 120a extends at a smaller distance to the center of the first lamp unit 100 in the vertical direction than the third part 124a. The third part 124a extends at a smaller distance to the outer edge of the first lamp unit 100 than the first part 120a. The direction of extension of the second part 122a is not limited to a direction perpendicular to the direction of extension of the first part 120a. It is only needed that the end of the second part 122a toward the third part 124a be positioned above the end toward the first part 120a.

The third part 124a includes a reflective element 126a such as a step on the surface thereof facing a space behind the lamp. The light of the first light source 106 incident from the incidence surface 118a passes through the first part 120a and the second part 122a and arrives at the third part 124a. The light arriving at the third part 124a travels toward the other end of the first light guide 108a and is also reflected by the reflective element 126a toward a space in front of the lamp. The light reflected by the reflective element 126a is output from the surface of the third part 124a facing a space in front of the lamp.

The auxiliary light guide 110a is provided on the side of the third part 124a toward a space in front of the lamp. The auxiliary light guide 110a is a columnar translucent member. The auxiliary light guide 110a includes an incidence surface 128a facing the surface of the third part 124a facing a space in front of the lamp and an output surface 130a facing a space in front of the lamp. The light output from the surface of the third part 124a facing a space in front of the lamp is incident on the auxiliary light guide 110a from the incidence surface 128a and is output toward a space front of the lamp from the output surface 130a.

The other first light guide 108b includes an incidence surface 118b, a first part 120b, a second part 122b, and a third part 124b. The incidence surface 118b is an end face of the first light guide 108b and is provided to face the first light source 106. The incidence surface 118b substantially faces a space behind the lamp. The light of the first light source 106 is incident on the first light guide 108b from the incidence surface 118b. The first part 120b is a part that extends from the incidence surface 118b toward one side in the direction of vehicle width and, in the case of this embodiment, outward in the direction of vehicle width. The second part 122b is a part that extends from an end of the first part 120b (the end farther from the incidence surface 118b) toward one side in the vertical direction, and, in the case of this embodiment, downward in the vertical direction. The third part 124b is a part that extends from an end of the second part 122b (the end farther from the first part 120b) toward the other side in the direction of vehicle width and, in the case of this embodiment, inward in the vehicle of vehicle width.

The first part 120b extends at a smaller distance to the center of the first lamp unit 100 in the vertical direction than the third part 124b. The third part 124b extends at a smaller distance to the outer edge of the first lamp unit 100 than the first part 120b. The direction of extension of the second part 122b is not limited to a direction perpendicular to the direction of extension of the first part 120b. It is only needed that the end of the second part 122b toward the third part 124b be positioned below the end toward the first part 120b.

The third part 124b includes a reflective element 126b such as a step on the surface thereof facing a space behind the lamp. The light of the first light source 106 incident from the incidence surface 118b passes through the first part 120b and the second part 122b and arrives at the third part 124b. The light arriving at the third part 124b travels toward the other end of the first light guide 108b and is also reflected by the reflective element 126b toward a space in front of the lamp. The light reflected by the reflective element 126b is output from the surface of the third part 124b facing a space in front of the lamp.

The auxiliary light guide 110b is provided on the side of the third part 124b toward a space in front of the lamp. The auxiliary light guide 110b is a columnar translucent member. The auxiliary light guide 110b includes an incidence surface 128b facing the face of the third part 124b facing a space in front of the lamp and an output surface 130b facing a space in front of the lamp. The light output from the surface of the third part 124b facing a space in front of the lamp is incident on the auxiliary light guide 110b from the incidence surface 128b and is output toward a space in front of the lamp from the output surface 130b.

The first light guide 108a is fixed to the lamp body 102 via a support member 132a. The first light guide 108b is fixed to the lamp body 102 via a support member 132b. Further, a cover member 134 is provided on the side of the first light source 106 and the first light guides 108a, 108b toward a space in front of the lamp. The cover member 134 covers and shields from view the first light source 106, the incidence surfaces 118a, 118b, the first parts 120a, 120b, and the second parts 122a, 122b. The cover member 134 includes openings 136a, 136b in a region overlapping the third parts 124a, 124b in the longitudinal direction of the lamp. The auxiliary light guide 110a is provided to extend through the opening 136a, and the output surface 130a projects from the opening 136a toward a space in front of the lamp. The auxiliary light guide 110b is provided to extend through the opening 136b, and the output surface 130b projects from the opening 136b toward a space in front of the lamp.

A connecting region R1a in the first light guide 108a connecting the first part 120a and the second part 122a is curved. Further, a connecting region R2a in the first light guide 108a connecting the second part 122a and the third part 124a is curved. A connecting region R1b in the first light guide 108b connecting the first part 120b and the second part 122b is curved. Further, a connecting region R2b in the first light guide 108b connecting the second part 122b and the third part 124b is curved. The connecting regions R1a, R1b are comprised of the ends of the first parts 120a, 120b and ends of the second parts 122a, 122b, respectively. The connecting regions R2a, R2b are comprised of the ends of the second parts 122a, 122b and ends of the third parts 124a, 124b, respectively.

In this embodiment, the ends of the first parts 120a, 120b including the incidence surfaces 118a, 118b respectively and the ends forming the connecting regions R1a, R1b respectively are curved, and the regions therebetween are straight. The ends of the second parts 122a, 122b forming the connecting regions R1a, R1b respectively and the ends forming the connecting regions R2a, R2b respectively are curved, and the regions therebetween are straight. The ends of the third parts 124a, 124b forming the connecting regions R2a, R2b respectively are curved, and the regions excluding those ends are straight. Therefore, the first light guides 108a, 108b are shaped such that the straight parts (portions of the first parts 120a, 120b), the curved parts (the connecting regions R1a, R1b), the straight parts (portions of the second parts 122a, 122b), the curved parts (the connecting regions R2a, R2b), and the straight parts (portions of the third parts 124a, 124b) are arranged in the stated order. The first light guides 108a, 108b may be curved in their entirety. In this case, the curvature from one end to the other may be uniform, or curves of different curvatures may be combined.

The first light guide 108a and the first light guide 108b are guided in the unit such that the incidence surface 118a of one of the first light guides 108a is positioned below the incidence surface 118b of the other first light guide 108b in the vertical direction. In other words, the incidence surface 118a of the first light guide 108a is provided below the incidence surface 118b of the first light guide 108b in the vertical direction, the first light guide 108a intersects the first light guide 108b in the middle of the path from the incidence surface 118a to the second part 122a via the first part 120a, and the second part 122a extends vertically upward. Conversely, the incidence surface 118b of the first light guide 108b is provided above the incidence surface 118a of the first light guide 108a in the vertical direction, the first light guide 108b intersects the first light guide 108a in the middle of the path from the incidence surface 118b to the second part 122b via the first part 120b, and the second part 122b extends downward in the vertical direction.

Figure 4A:
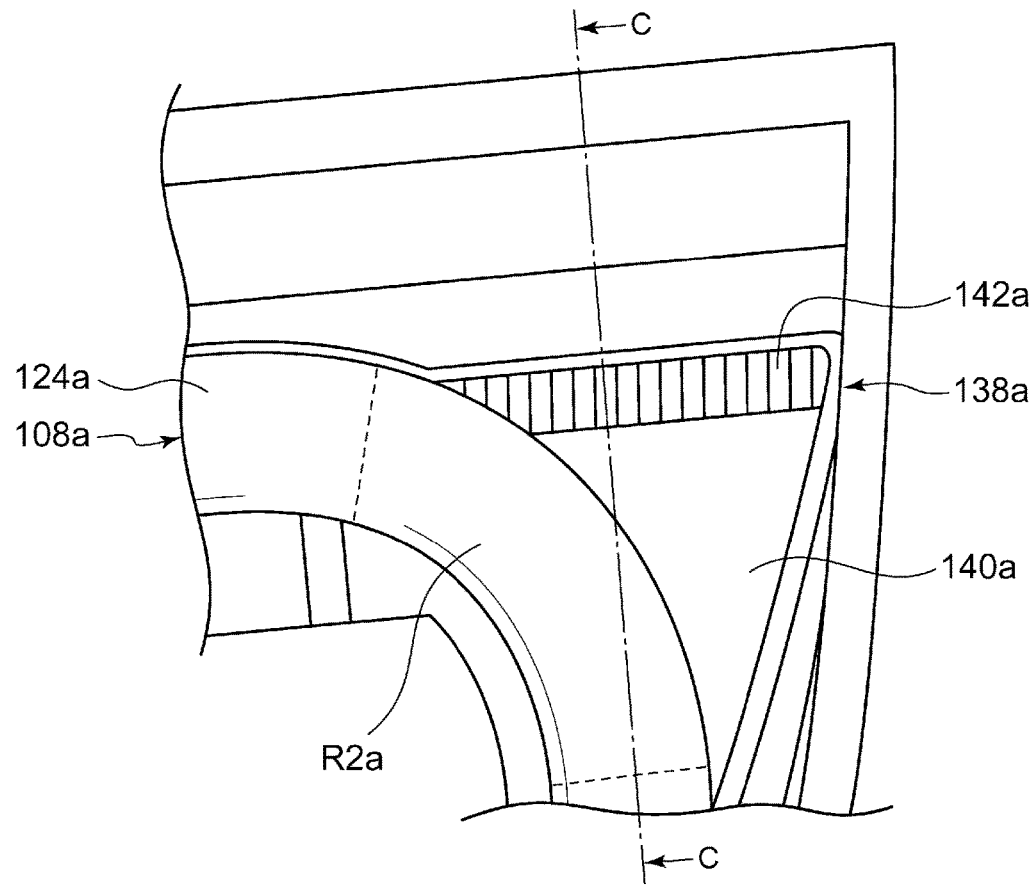
FIG. 4A is an enlarged view of a region including the projection in the first lamp unit.
Figure 4B:
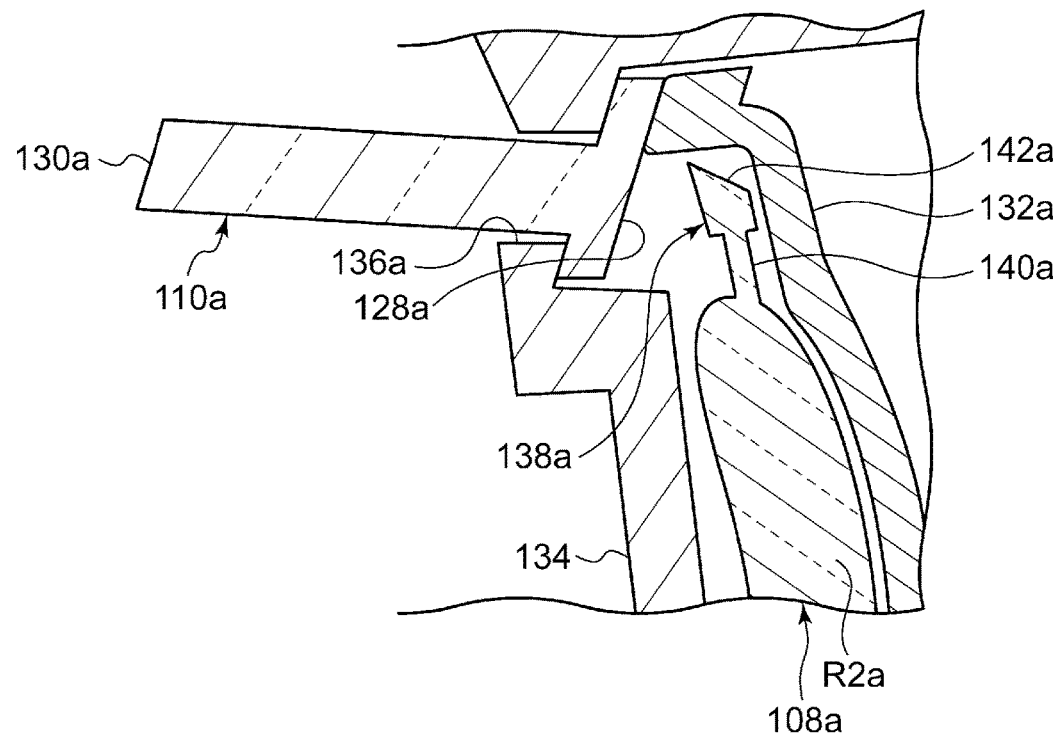
FIG. 4B is a C-C cross-sectional view of FIG. 4A.

Further, the first light guides 108a, 108b have projections 138a, 138b that project from the connecting regions R2a, R2b outward from the curves of the connecting regions R2a, R2b, respectively. The projection 138a and the projection 138b have substantially the same structure so that the projection 138a will be described in detail, and a description of the projection 138b will be omitted below. FIG. 4A is an enlarged view of a region including the projection in the first lamp unit. FIG. 4B is a C-C cross-sectional view of FIG. 4A.

The projection 138a is a light guide member that guides light from the connecting region R2a toward a region outside the curve of the connecting region R2a. The projection 138a includes a main body part 140a and an output part 142a. The main body part 140a is a flat part projecting from the outer surface of the connecting region R2a. The output part 142a is provided at the end of the main body part 140a. The output part 142a has a reflective element such as a step and is capable of outputting the light incident from the connecting region R2a into the main body part 140a toward a space in front of the lamp. The output part 142a is shaped in a band that extends parallel to the straight portion of the third part 124a and is provided on the same line as the straight portion of the third part 124a.

The cover member 134 is also provided on the side of the projection 138a toward a space in front of the lamp, but the opening 136a is provided on the side of the output part 142a toward a space in front of the lamp. The auxiliary light guide 110a extends to a region in which the auxiliary light guide 110a overlaps the output part 142a in the longitudinal direction of the lamp. The light output from the output part 142a is incident on the auxiliary light guide 110a from the incidence surface 128a and is output toward a space in front of the lamp from the output surface 130a.

As shown in FIG. 1, the second lamp unit 200 is provided with a lamp body 202 having an opening and a translucent outer cover (not shown) that covers the opening of the lamp body 202. A lamp chamber formed by the lamp body 202 and the outer cover is provided with a second light source 206 and two second light guides 208a, 208b. Like the first light source 106, the second light source 206 is comprised of an LED unit. The two second light guides 208a, 208b are columnar translucent members and are made of the same material as the first light guides 108a, 108b.

One of the second light guides 208a includes an incidence surface 218a, a fourth part 220a, a fifth part 222a, and a sixth part 224a. The incidence surface 218a is an end face of the second light guide 208a and is provided to face the second light source 206. The incidence surface 218a substantially faces a space behind the lamp. The light of the second light source 206 is incident on the second light guide 208a from the incidence surface 218a. The fourth part 220a is a part that extends from the incidence surface 218a in a direction away from the movable part 2 in the direction of vehicle width and, in the case of this embodiment, outward in the direction of vehicle width. The fifth part 222a is a part that extends from an end of the fourth part 220a toward one side in the vertical direction, and, in the case of this embodiment, upward in the vertical direction. The sixth part 224a is a part that extends from an end of the fifth part 222a in a direction toward the movable part 2 in the direction of vehicle width and, in the case of this embodiment, inward in the direction of vehicle width. In this embodiment, the ends of the fourth part 220a are curved, and the regions excluding the ends are straight. The fifth part 222a is curved in its entirety. The end of the sixth part 224a toward the fifth part 222a is curved, and the regions excluding the end are straight.

The fifth part 222a and the sixth part 224a include a reflective element such as a step (not shown) on the surfaces thereof facing a space behind the lamp. The light of the second light source 206 incident from the incidence surface 218a passes through the fourth part 220a and arrives at the fifth part 222a. The light arriving at the fifth part 222a travels toward the sixth part 224a, and a portion of the light is reflected by the reflective element toward a space in front of the lamp. The light transmitted through the fifth part 222a and arriving at the sixth part 224a travels toward the other end of the second light guide 208a and is reflected by the reflective element toward a space in front of the lamp. The light reflected by the reflective element is output from the surfaces of the fifth part 222a and the sixth part 224a facing a space in front of the lamp.

The first part 120a of the first light guide 108a extends in a direction toward the fixed part 4 in the direction of vehicle width. Further, in terms of the vertical direction, the second part 122a extends in the same direction (upward or downward) as the fifth part 222a. Further, the third part 124a extends in a direction away from the fixed part 4 in the direction of vehicle width.

The other second light guide 208b includes an incidence surface 218b, a fourth part 220b, a fifth part 222b, and a sixth part 224b. The incidence surface 218b is an end face of the second light guide 208b and is provided to face the second light source 206. The incidence surface 218b substantially faces a space behind the lamp. The light of the second light source 206 is incident on the second light guide 208b from the incidence surface 218b. The fourth part 220b is a part that extends from the incidence surface 218b in a direction away from the movable part 2 in the direction of vehicle width and, in the case of this embodiment, outward in the direction of vehicle width. The fourth part 220b extends in close proximity to and parallel to the fourth part 220a. The fifth part 222b is a part that extends from an end of the fourth part 220b toward one side in the vertical direction, and, in the case of this embodiment, downward in the vertical direction. The sixth part 224b is a part that extends from an end of the fifth part 222b in a direction toward the movable part 2 in the direction of vehicle width and, in the case of this embodiment, inward in the direction of vehicle width. In this embodiment, the ends of the fourth part 220b are curved, and the regions excluding the ends are straight. The fifth part 222b is curved in its entirety. The end of the sixth part 224b toward the fifth part 222b is curved, and the regions excluding the end are straight.

The fifth part 222b and the sixth part 224b include a reflective element such as a step (not shown) on the surfaces thereof facing a space behind the lamp. The light of the second light source 206 incident from the incidence surface 218b passes through the fourth part 220b and arrives at the fifth part 222b. The light arriving at the fifth part 222b travels toward the sixth part 224b, and a portion of the light is reflected by the reflective element toward a space in front of the lamp. The light transmitted through the fifth part 222b and arriving at the sixth part 224b travels toward the other end of the second light guide 208b and is reflected by the reflective element toward a space in front of the lamp. The light reflected by the reflective element is output from the surfaces of the fifth part 222b and the sixth part 224b facing a space in front of the lamp.

The first part 120b of the first light guide 108b extends in a direction toward the fixed part 4 in the direction of vehicle width. Further, in terms of the vertical direction, the second part 122b extends in the same direction (upward or downward) as the fifth part 222b. Further, the third part 124b extends in a direction away from the fixed part 4 in the direction of vehicle width.

Figure 5:
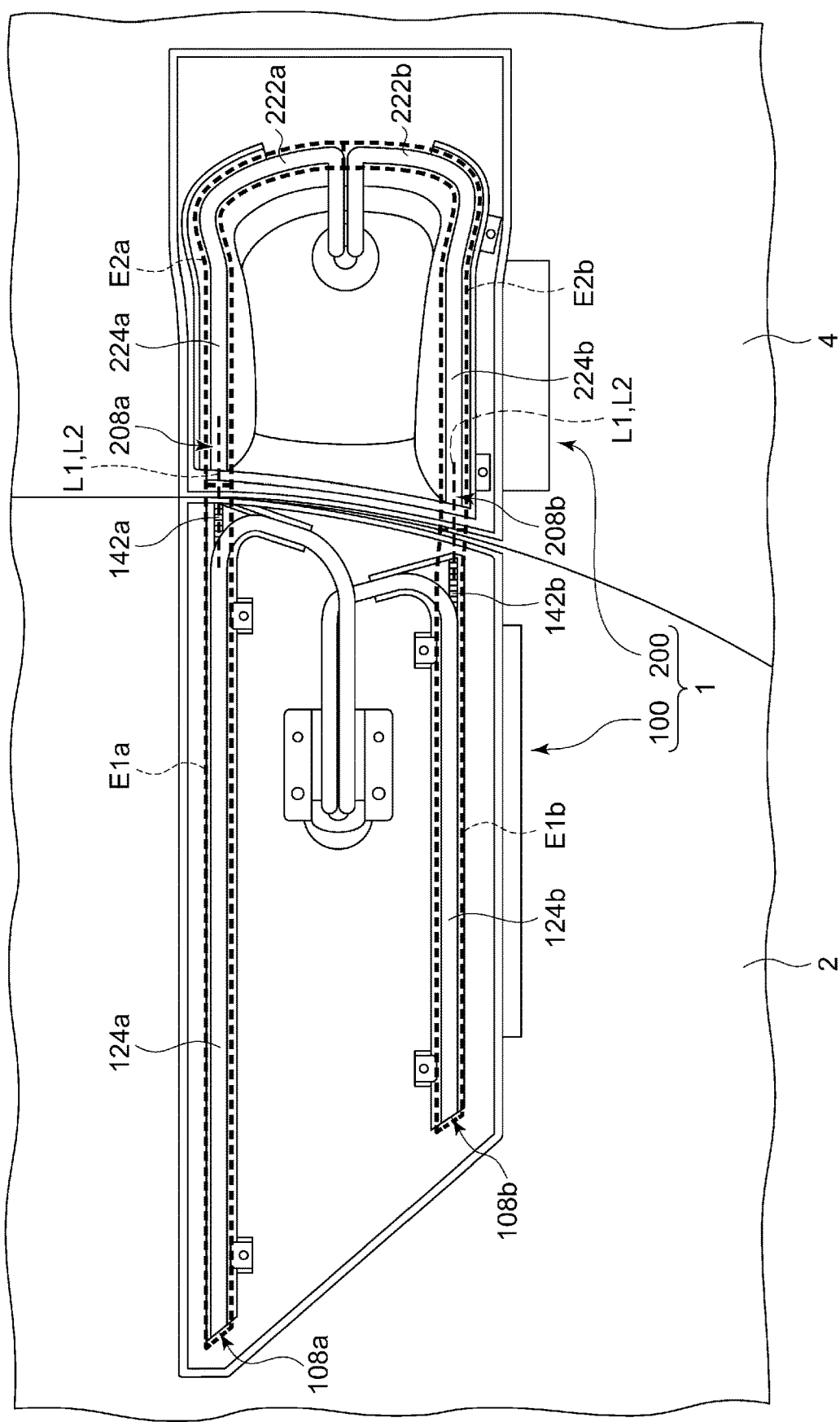
FIG. 5 schematically shows a light emitting region of the vehicle lamp.

FIG. 5 schematically shows a light emitting region of the vehicle lamp. In the vehicle lamp 1 according to this embodiment, at least a portion of each of the third parts 124a, 124b and the sixth parts 224a, 224b outputs light toward a space in front of the lamp so as to form a linear light emitting region. Further, the third parts 124a, 124b and the sixth parts 224a, 224b are provided such that extensions L1, L2 of the light emitting regions respectively formed by the third parts and the sixth parts are smoothly continuous.

More specifically, the region in the first lamp unit 100 where the output surface 130a of the auxiliary light guide 110a extends, i.e., the region where the third part 124a and the output part 142a extend, forms a light emitting region E1a. The area where the output surface 130b of the auxiliary light guide 110b extends, i.e., the area where the third part 124b and the output part 142b extend, forms a light emitting region E1b. Therefore, the first parts 120a, 120b and the second parts 122a, 122b in the first light guides 108a, 108b primarily function as light guiding parts, and the third parts 124a, 124b and the output parts 142a, 142b primarily function as light emitting parts.

In the second lamp unit 200, the area where the fifth part 222*a* and the sixth part 224*a* extend forms a light emitting region E2*a*, and the area where the fifth part 222*b* and the sixth part 224*b* extend forms a light emitting region E2*b*. Therefore, the fourth parts 220*a*, 220*b* in the second light guides 208*a*, 208*b* primarily function as light guiding parts, and the fifth parts 222*a*, 222*b* and the sixth parts 224*a*, 224*b* primarily function as light emitting parts.

The third part 124*a*, the output part 142*a*, and the sixth part 224*a* are arranged in the stated order and are positioned substantially on the same line. Similarly, the third part 124*b*, the output part 142*b*, and the sixth part 224*b* are arranged in the stated order and are positioned substantially on the same line. By providing the projections 138*a*, 138*b*, the ends of the light emitting regions E1*a*, E1*b* are caused to be in closer proximity to the ends of the light emitting regions E2*a*, E2*b*, respectively. Further the fourth parts 220*a*, 220*b* of the second light guide 208*a* and the second light guide 20*b* are in close proximity to each other and extend parallel to each other. Therefore, the end of the fifth part 222*a* and the end of the fifth part 222*b* are also in close proximity to each other. Therefore, the end of the light emitting region E2*a* opposite to the light emitting region E1*a* and the end of the light emitting region E2*b* opposite to the light emitting region E1*b* are also in close proximity to each other.

Thus, the vehicle lamp 1 of this embodiment allows the light emitting region E1*a*, the light emitting region E2*a*, the light emitting region E2*b*, and the light emitting region E1*b* to be visible as a continuous linear light emitting region. The output part 142*a* represents the extension L1 of the light emitting region formed by the third part 124*a* and also represents the extension L2 of the light emitting region formed by the sixth part 224*a*. Therefore, the state where the third part 124*a*, the output part 142*a*, and the sixth part 224*a* are arranged on the same line represents a state where the extension L1 of the light emitting region formed by the third part 124*a* and the extension L2 of the light emitting region formed by the sixth part 224*a* are smoothly continuous with each other, i.e., a state where the extensions L1, L2 overlap each other. The same is true of the third part 124*b*, the output part 142*b*, and the sixth part 224*b*.

The light emitting regions E1*a*, E1*b* can be formed to be narrow by making the width of the output surfaces 130*a*, 130*b* of the auxiliary light guides 110*a*, 110*b* smaller than the width of the reflective elements 126*a*, 126*b*, respectively. The light emitting regions E2*a*, E2*b* can also be formed to be narrow by providing auxiliary light guides on the sides of the fifth parts 222*a*, 222*b* and the sixth parts 224*a*, 224*b* toward a space in front of the lamp and making the width of the output surfaces of the auxiliary light guides smaller than the width of the reflective elements.

The light emitting regions E1*a*, E1*b*, E2*a*, E2*b* of the vehicle lamp 1 realize light distribution of a tail lamp. Further, the vehicle lamp 1 is provided with a further light source (not shown) and realizes light distribution of a stop lamp by lighting that light source. Further, the vehicle lamp 1 can also be provided with other publicly known lamp functions such as a turn lamp, a back lamp, etc.

As described above, the vehicle lamp 1 according to this embodiment is provided with the first light source 106, and the columnar first light guides 108*a*, 108*b*. The first light guides 108*a*, 108*b* include the incidence surfaces 118*a*, 118*b*, the first parts 120*a*, 120*b* that extend from the incidence surfaces 118*a*, 118*b* toward one side in the direction of vehicle width, the second parts 122*a*, 122*b* that extend from the ends of the first parts 120*a*, 120*b* in the vertical direction, and the third parts 124*a*, 124*b* that extend from ends of the second parts 122*a*, 122*b* toward the other side in the direction of vehicle width.

In vehicle lamps in which a light guide is used, it has been common to provide the end face of the light guide at the outer edge of the vehicle lamp and provide a light source to face the end face. This has limited the space available for installation of the light source. Further, expansion of the space for installation of the light source would result in a larger vehicle lamp. Since the thickness of the movable part 2 is smaller than that of the fixed part 4, it is inherently difficult to increase the size of the lamp unit installed on the side of the movable part 2 of the vehicle.

By way of contrast, the vehicle lamp 1 according to this embodiment is provided with the first light guides 108*a*, 108*b* having the configuration described above and so makes it possible to provide the first light source 106 at the center of the vehicle lamp 1. It is easier to secure a space for installation of a light source at the center of the vehicle lamp 1 than at the outer edge. Therefore, the space for installation of the first light source 106 is secured while at the same time inhibiting an increase in the size of the vehicle lamp 1.

Since the space for installation of the first light source 106 is secured, an LED unit, which is larger in size than a single LED, can be employed as the first light source 106. This makes it possible to replace the first light source 106 easily and improves the maintainability of the vehicle lamp 1.

The vehicle lamp 1 is also provided with the two first light guides 108*a*, 108*b*. The second part 122*a* of one of the first light guides 108*a* extends upward in the vertical direction, and the second part 122*b* of the other first light guide 108*b* extends downward in the vertical direction. This makes it possible to provide the first lamp unit 100 having a novel structure. Further, the design and appearance of the vehicle lamp 1 are improved.

Further, the connecting regions R1*a*, R1*b* of the first light guides 108*a*, 108*b* connecting the first parts 120*a*, 120*b* and the second parts 122*a*, 122*b*, respectively, are curved. Further, the connecting regions R2*a*, R2*b* of the first light guides 108*a*, 108*b* connecting the second parts 122*a*, 122*b* and the third parts 124*a*, 124*b*, respectively, are curved. This inhibits the light traveling inside the first light guides 108*a*, 108*b* from being output outside the light guide in the respective connecting regions. As a result, the efficiency of transmission of light to the third parts 124*a*, 124*b* in the first light guides 108*a*, 108*b* is increased.

Further, the incidence surface 118*a* of one of the first light guides 108*a* is positioned below the incidence surface 118*a* of the other first light guide 108*b* in the vertical direction. Therefore, the first light guide 108*a* and the first light guide 108*b* intersect each other in a region from the incidence surfaces 118*a*, 118*b* to the third parts 124*a*, 124*b*. By providing the first light guide 108*a* and the first light guide 108*b* in this way, the curvature of the connecting regions R1, R1*b* is reduced accordingly. As a result, the efficiency of transmission of light to the third parts 124*a*, 124*b* in the first light guides 108*a*, 108*b* is increased.

Further, the first light guides 108*a*, 108*b* include the projections 138*a*, 138*b* that project outside the curve from the connecting regions R2*a*, R2*b* connecting the second parts 122*a*, 122*b* and the third parts 124*a*, 124*b*, respectively. The projections 138*a*, 138*b* guide the light leaking outside the curve from the connecting regions R2*a*, R2*b* to the regions that are extensions from the third parts 124*a*, 124*b* and output the light to a space in front of the lamp. This increases the efficiency of using the light in the first light guide 108*a*, 108*b*. It also makes it possible to provide the light emitting regions E1*a*, E1*b* in closer proximity to the outer edge of the first lamp unit 100. Accordingly, integration of the light emitting regions E1*a*, E1*b* of the first lamp unit 100 with the light emitting regions E2*a*, E2*b* of the second lamp unit 200 is improved.

Further, the vehicle lamp 1 is provided with the first lamp unit 100 provided in the movable part 2 of the vehicle and the second lamp unit 200 provided in the fixed part 4 of the vehicle adjacent to the movable part 2. The first lamp unit 100 and the second lamp unit 200 are adjacent to each other in the direction of vehicle width. The second lamp unit 200 is provided with the second light source 206 and the columnar second light guides 208*a*, 208*b*. The second light guides 208*a*, 208*b* include the incidence surfaces 218*a*, 218*b*, the fourth parts 220*a*, 220*b* extending from the incidence surfaces 218*a*, 218*b* in a direction away from the movable part 2 in the direction of vehicle width, the fifth parts 222*a*, 222*b* that extend from the ends of the fourth parts 220*a*, 220*b* in the vertical direction, and the sixth parts 224*a*, 224*b* that extend from the ends of the fifth parts 222*a*, 222*b* in a direction toward the movable part 2 in the direction of vehicle width.

Meanwhile, the first lamp unit 100 is provided with the first light source 106 and the first light guides 108*a*, 108*b*. The first part 120*a* of the first light guide 108*a* extends in a direction toward the fixed part 4 in the direction of vehicle width, the second part 122*a* extends in the same direction as the fifth part 222*a* in the vertical direction, and the third part 124*a* extends in a direction away from the fixed part 4 in the direction of vehicle width. Further, the first part 120*b* of the first light guide 108*b* extends in a direction toward the fixed part 4 in the direction of vehicle width, the second part 122*b* extends in the same direction as the fifth part 222*b* in the vertical direction, and the third part 124*b* extends in a direction away from the fixed part 4 in the direction of vehicle width. The third parts 124*a*, 124*b* form respective portions of the light emitting regions E1*a*, E1*b*, and the sixth parts 224*a*, 224*b* form respective portions of the light emitting regions E2*a*, E2*b*. Further, the third parts 124*a*, 124*b* and the sixth parts 224*a*, 224*b* are provided such that the extensions L1, L2 of the light emitting regions respectively formed by the third parts and the sixth parts are smoothly continuous.

In the case the light guide is provided in each of the movable part 2 provided on the inner side in the direction of vehicle width and the fixed part provided on the outer side in the direction of vehicle width to form a continuous light emitting region from the movable part 2 toward the fixed part 4, it has been common in the related-art vehicle lamp to cause light to be incident on the light guide of the movable part 2 from the inner side in the direction of vehicle width and cause light to be incident on the light guide of the fixed part 4 from the outer side in the direction of vehicle width for ease of installation of the light source.

In this case, however, the brightness in the light guide of the movable part 2 tends to be gradually lowered in an outward direction (from the inner side toward the outer side) in the direction of vehicle width and the brightness in the light guide of the fixed part 4 tends to be gradually lowered in an inward direction (from the outer side toward the inner side) in the direction of vehicle width. This is because the light flux is in a large amount in a region of the light guide near the light source but the amount of light flux is lowered at the opposite end due to light guide loss or transmission attenuation. As a result, a light emitting region that is bright at the ends and dark at the center is formed in the vehicle lamp as a whole.

When the vehicle lamp is viewed from the outer side in the direction of vehicle width, the light guide of the movable part 2 tends to look bright and the light guide of the fixed part 4 tends to look dark. Meanwhile, when the vehicle lamp is viewed from the inner side in the direction of vehicle width, the light guide of the movable part 2 tends to look dark and the light guide of the fixed part 4 tends to look bright. This is because the light travels outward in the direction of vehicle width in the light guide of the movable part 2 so that a larger amount of light can be radiated outward in the direction of vehicle width than in the light guide of the fixed part 4, and the light travels inward in the direction of vehicle width in the light guide of the fixed part 4 so that a larger amount of light can be radiated inward in the direction of vehicle width than in the light guide of the movable part 2. Thus, regardless of whether the vehicle lamp is viewed inward or outward in the direction of vehicle width, the brightness of the light emitting region looks different between the side toward the movable part 2 and the side toward the fixed part 4.

Meanwhile, the first light guides 108*a*, 108*b* toward the movable part 2 are guided outward from the first light source 106 in the direction of vehicle width and is then turned inward in the direction of vehicle width. The light from the first light source 106 travels inward (from the outer side toward inner side) in the third parts 124*a*, 124*b* forming the light emitting regions E1*a*, E1*b* on the side of the movable part 2. Further, in the second light guides 208*a*, 208*b* on the side of the fixed part 4, the direction of travel of light in the sixth parts 224*a*, 224*b* forming the light emitting regions E2*a*, E2*b* are identical to the direction of travel of light in the third parts 124*a*, 124*b*. The third parts 124*a*, 124*b* are provided by way of extensions of the sixth parts 224*a*, 224*b*. This can realize light emitting regions in which the brightness is continuously lowered inward (from the outer side toward the inner side) in the direction of vehicle width, i.e., graded light distribution. It can also make the brightness of the light emitting region on the side of the movable part 2 and that of the fixed part 4 more uniform when they are observed from the outer side and from the inner side in the direction of vehicle width.

The embodiments of the present invention are not limited to those described above and various modifications such as design changes may be made based on the knowledge of a skilled person, and embodiments with such modifications are also within the scope of the present invention. A new embodiment modified as described above will provide the combined advantages of the embodiment and the variation as combined.

The vehicle lamp 1 according to this embodiment is provided with the two first light guides 108*a*, 108*b* but may be provided with only one of the first light guides 108*a*, 108*b*. Similarly, the vehicle lamp 1 is provided with the two second light guides 208*a*, 208*b* but may be provided with only one of the second light guides 208*a*, 208*b*.

What is claimed is:

1. A vehicle lamp comprising:
a first light source; and
an elongated first light guide, wherein
the first light guide includes an incidence surface on which light of the first light source is incident, a first part that extends from the incidence surface toward one side in a direction of vehicle width, a second part that extends from an end of the first part toward one side in the vertical direction, and a third part that extends from an end of the second part toward the other side in the direction of vehicle width, wherein the first part, the second part and the third part are columnar, wherein the first part is closer to a center of the vehicle lamp in the vertical direction than the third part to the center of the vehicle lamp in the vertical direction, and the first light source is an LED unit, and the LED unit includes an LED and a mount used to carry the LED and mount the LED unit on a body of the vehicle lamp detachably, wherein the mount is detachably fitted in a through hole provided in a body of the vehicle lamp, wherein the vehicle lamp includes a first lamp unit provided in a movable part of the vehicle and a second lamp unit provided in a fixed part of the vehicle adjacent to the movable part, the first lamp unit and the second lamp unit are adjacent to each other in the direction of vehicle width, the second lamp unit includes a second light source and an elongated second light guide, the second light guide includes an incidence surface on which light of the second light source is incident, a fourth part that extends from the incidence surface in a direction away from the movable part in the direction of vehicle width, a fifth part that extends from an end of the fourth part toward one side in the vertical direction, and a sixth part that extends from an end of the fifth part in a direction toward the movable part in the direction of vehicle width, wherein the fourth part, the fifth part and the sixth part are columnar, the first lamp unit includes the first light source and the first light guide, the first part of the first light guide extends in a direction toward the fixed part in the direction of vehicle width, the second part extends in the same direction as the fifth part in the vertical direction, and the third part extends in a direction away from the fixed part in the direction of vehicle width, at least a portion of each of the third part and the sixth part outputs light toward a space in front of the lamp so as to form a linear light emitting region, and the third part and the sixth part are provided such that extensions of the light emitting regions respectively formed by the third part and the sixth part overlap each other.

2. The vehicle lamp according to claim 1, wherein two first light guides are provided, the second part of one of the first light guides extends upward in the vertical direction, and the second part of the other first light guide extends downward in the vertical direction.

3. The vehicle lamp according to claim 2, wherein the incidence surface of one of the first light guides is positioned below the incidence surface of the other first light guide in the vertical direction.

4. The vehicle lamp according to claim 1, wherein a connecting region of the first light guide connecting the second part and the third part is curved, and the first light guide includes a projection that projects from the connecting region and outward from the curve of the connecting region and that guides light to a region outside the curve.

5. The vehicle lamp according to claim 2 comprising:

a cover member that shields from view the first light source, the incident surfaces, the first parts, and the second parts and includes openings in a region overlapping the third parts in a longitudinal direction of the vehicle lamp.

* * * * *